(12) United States Patent
Kalantari et al.

(10) Patent No.: US 12,361,703 B2
(45) Date of Patent: Jul. 15, 2025

(54) COMPUTER SOFTWARE MODULE ARRANGEMENT, A CIRCUITRY ARRANGEMENT, AN ARRANGEMENT AND A METHOD FOR IMPROVED OBJECT DETECTION

(71) Applicant: Telefonaktiebolaget LM Ericsson (publ), Stockholm (SE)

(72) Inventors: Ashkan Kalantari, Malmö (SE); Héctor Caltenco, Oxie (SE); Saeed Bastani, Dalby (SE); Yun Li, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 463 days.

(21) Appl. No.: 17/625,390

(22) PCT Filed: Jul. 17, 2019

(86) PCT No.: PCT/EP2019/069244
§ 371 (c)(1),
(2) Date: Jan. 7, 2022

(87) PCT Pub. No.: WO2021/008702
PCT Pub. Date: Jan. 21, 2021

(65) Prior Publication Data
US 2022/0284689 A1    Sep. 8, 2022

(51) Int. Cl.
*G06V 10/94* (2022.01)
*G06V 10/10* (2022.01)
(Continued)

(52) U.S. Cl.
CPC .............. *G06V 10/95* (2022.01); *G06V 10/17* (2022.01); *G06V 10/454* (2022.01); *G06V 10/82* (2022.01); *G06V 20/52* (2022.01); *G06V 10/16* (2022.01)

(58) Field of Classification Search
CPC ...... G06V 10/95; G06V 10/454; G06V 10/82; G06V 10/17; G06V 10/16; G06V 20/52; G06F 18/253
See application file for complete search history.

(56) References Cited

U.S. PATENT DOCUMENTS

| 10,055,853 B1 | 8/2018 | Fisher et al. |
| 10,198,655 B2 | 2/2019 | Hotson et al. |

(Continued)

FOREIGN PATENT DOCUMENTS

| CN | 105512680 A | 4/2016 |
| CN | 108038420 A | 5/2018 |

(Continued)

OTHER PUBLICATIONS

Lee, Daehyun, Jongmin Lee, and Kee-Eung Kim. "Multi-view automatic lip-reading using neural network." Computer Vision—ACCV 2016 Workshops: ACCV 2016 International Workshops, Taipei, Taiwan, Nov. 20-24, 2016, Revised Selected Papers, Part II 13. Springer International Publishing, 2017. (Year: 2017).*

(Continued)

*Primary Examiner* — Vu Le
*Assistant Examiner* — Tracy Mangialaschi
(74) *Attorney, Agent, or Firm* — Weisberg I.P. Law, P.A.

(57) ABSTRACT

An object detection arrangement having a controller configured to: a) receive a plurality of image data streams; b) perform feature extraction on each of the received a plurality of images providing a plurality of feature data streams; and to c) perform a common feature extraction based on the plurality of feature data streams providing as common feature data stream for object detection.

14 Claims, 5 Drawing Sheets

(51) Int. Cl.
*G06V 10/44* (2022.01)
*G06V 10/82* (2022.01)
*G06V 20/52* (2022.01)

(56) References Cited

U.S. PATENT DOCUMENTS

| | | | |
|---|---|---|---|
| 2003/0215141 | A1 | 11/2003 | Zakrzewski et al. |
| 2006/0083423 | A1 | 4/2006 | Brown et al. |
| 2015/0304634 | A1 | 10/2015 | Karvounis |
| 2016/0275375 | A1 | 9/2016 | Kant |
| 2017/0206415 | A1 | 7/2017 | Redden |
| 2017/0220854 | A1* | 8/2017 | Yang .................. G06V 20/46 |
| 2018/0005054 | A1 | 1/2018 | Yu et al. |
| 2019/0025773 | A1 | 1/2019 | Yang et al. |
| 2019/0065910 | A1 | 2/2019 | Wang et al. |
| 2019/0087975 | A1 | 3/2019 | Versace et al. |
| 2019/0138855 | A1* | 5/2019 | Sohn .................. G06F 18/24 |

FOREIGN PATENT DOCUMENTS

| | | |
|---|---|---|
| CN | 108629368 A | 10/2018 |
| GB | 2549836 A | 1/2017 |
| KR | 20180125885 | 11/2018 |
| WO | 2018088170 A1 | 5/2018 |

OTHER PUBLICATIONS

Donahue, Jeff, et al. "Long-term Recurrent Convolutional Networks for Visual Recognition and Description." arXiv preprint arXiv: 1411.4389v4 (2016). (Year: 2016).*

Yu, Sheng, et al. "A novel recurrent hybrid network for feature fusion in action recognition." Journal of Visual Communication and Image Representation 49 (2017): 192-203. (Year: 2017).*

International Search Report and Written Opinion dated May 20, 2020 for Application No. PCT/EP2019/069244 filed Jul. 17, 2019, consisting of 10 pages.

Donahue et al. "Long-term Recurrent Convolutional Networks for Visual Recognition and Description" California Univ Berkeley Elec Eng Sci Dept; May 31, 2016, consisting of 14 pages.

Daehyun Lee et al. "Multi-view Automatic Lip-Reading Using Neural Network" School of Computing, KAIST, Daejeon, Korea, 2017, consisting of 13 pages.

Kavi et al. "Multiview fusion for activity recognition using deep neural networks"; Journal of Electronic Imaging; 2016, consisting of 9 pages.

Tao et al. "Moving object recognition using multi-view three-dimensional convolutional neural networks"; Neural Comput &Applic; CrossMark; 2017, consisting of 9 pages.

Liu et al. "Mobile Video Object Detection with Temporally-Aware Feature Maps"; arXiv:1711.06368v2; Mar. 28, 2018; consisting of 10 pages.

Zhang et al. "ML-LocNet: Improving Object Localization with Multi-view Learning Network"; National University of Singapore; ECCV 2018, consisting of 16 pages.

* cited by examiner

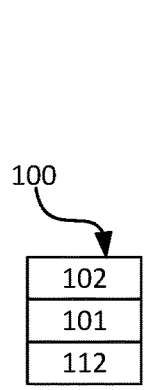
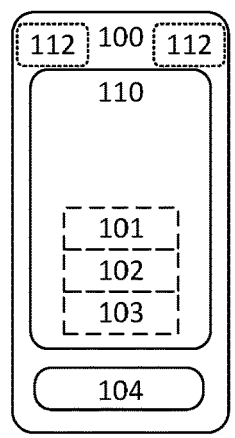
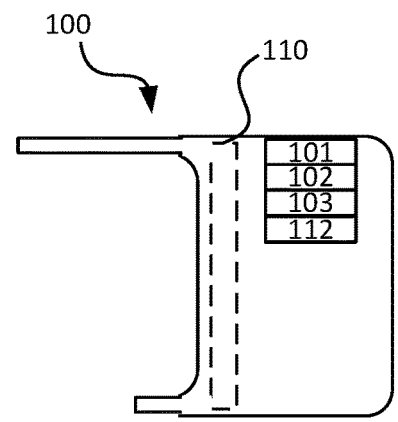
FIG. 1A
FIG. 1B
FIG. 1C
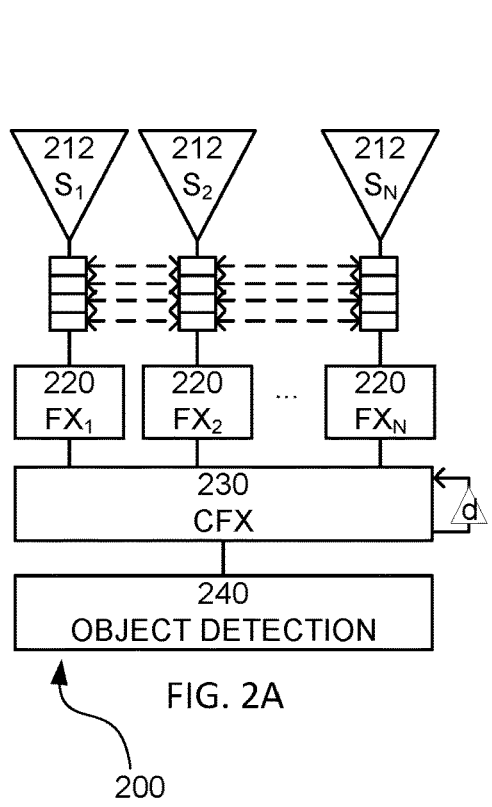
FIG. 2A
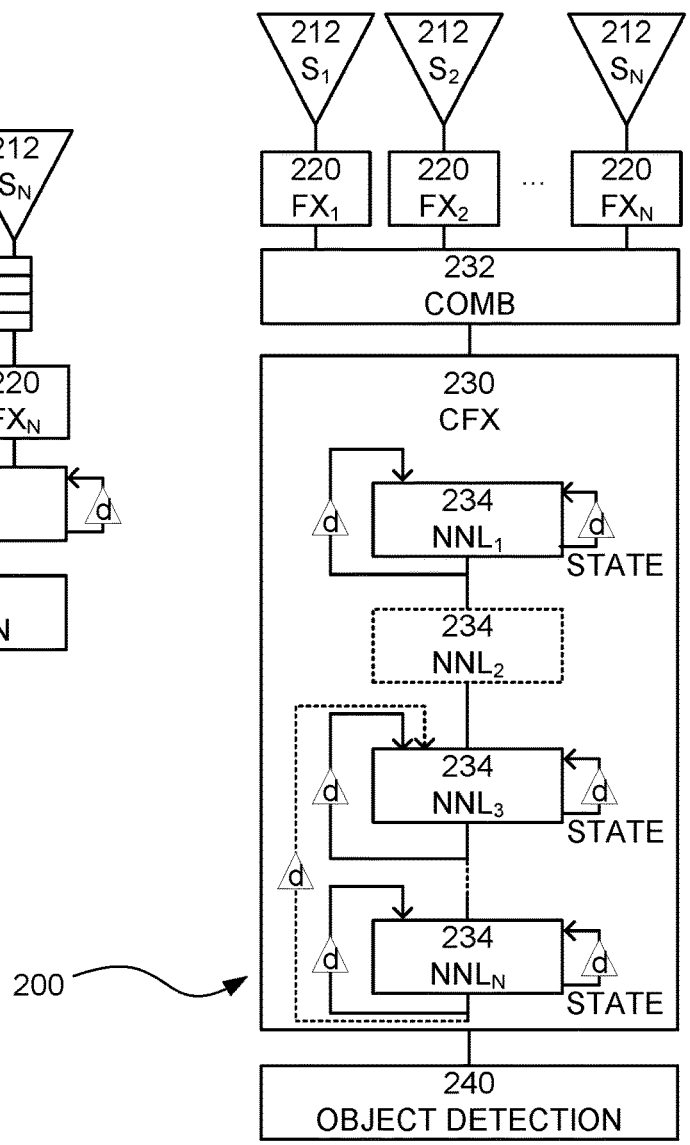
FIG. 2B

COMPUTER SOFTWARE MODULE ARRANGEMENT, A CIRCUITRY ARRANGEMENT, AN ARRANGEMENT AND A METHOD FOR IMPROVED OBJECT DETECTION

CROSS-REFERENCE TO RELATED APPLICATION

This application is a Submission Under 35 U.S.C. § 371 for U.S. National Stage Patent Application of International Application Number: PCT/EP2019/069244, filed Jul. 17, 2019 entitled "COMPUTER SOFTWARE MODULE ARRANGEMENT, A CIRCUITRY ARRANGEMENT, AN ARRANGEMENT AND A METHOD FOR IMPROVED OBJECT DETECTION," the entirety of which is incorporated herein by reference.

TECHNICAL FIELD

The present invention relates to an arrangement, an arrangement comprising computer software modules, an arrangement comprising circuits, a device and a method for providing an improved manner of improved object detection, and in particular to an arrangement, an arrangement comprising computer software modules, an arrangement comprising circuits, a device and a method for providing an improved manner of providing efficient feature extraction using neural networks.

BACKGROUND

Object detection is a computer technology related to computer vision and image processing that deals with detecting instances of semantic objects of certain classes (such as humans, buildings, or cars) in digital images and videos. Well-researched domains of object detection include face or pose detection for detecting humans and automotive related object detection (pedestrian, cars, lanes, signs, etc.). Object detection has applications in many areas of computer vision, including image retrieval, industrial use, robotic vision and video surveillance.

Methods for object detection generally fall into either classic machine learning-based approaches or deep learning-based approaches. For classic Machine Learning approaches, it becomes necessary to first define features, then using a technique such as support vector machine (SVM) to do the classification and consequently the object detection. Deep learning techniques are able to do end-to-end object detection and are typically based on neural networks, such as convolutional neural networks (CNN), where the features are extracted as part of the process in one or several layers of the neural network.

The multi-task nature of object detection has made it a challenging task. For this reason, the existing solutions achieve far below human accuracy even for simple tasks (such as Pascal VOC dataset), let alone their huge decline in accuracy for difficult tasks, such as objects in context (MS COCO, for instance). Extending these solutions for further improvement of accuracy entails a significant increase in model size, and thus increased resource consumption (power, memory, processing). This issue is even more pronounced when hard-to-recognize objects are present in the image (e.g., small objects, blurry objects, etc.). There is thus a need for high accuracy object detection that can be realized without or with only a negligible increase in model complexity (e.g. computations, memory, and energy usage).

The inventors have realized a problem that exist in contemporary inference pipeline, namely that the inference is utilizing a singular aspect of the objects, that is, the entire stream or input of image data is processed in the same manner focusing on one aspect.

As the inventors have realized, there is thus a need for a device and a method for providing a manner of detecting objects that does not require vast processing resources nor an increase in object detection model complexity, while still allowing for a higher accuracy of object detection.

SUMMARY

An object of the present teachings is to overcome or at least reduce or mitigate the problems discussed in the background section.

According to one aspect an object detection arrangement is provided, the object detection arrangement comprises a controller configured to: a) receive a plurality of image data streams; b) perform feature extraction on each of the received a plurality of images providing a plurality of feature data streams; and to c) perform a common feature extraction based on the plurality of feature data streams providing as common feature data stream for object detection.

The solution may be implemented as a software solution, a hardware solution or a mix of software and hardware components.

In one embodiment the controller is further configured to perform object detection for the image utilizing an object detection model. In one embodiment the object detection model is based on a Deep Neural Network model.

In one embodiment the controller is further configured to d) perform object detection based on the common feature data stream.

In one embodiment the controller is further configured to apply a plurality of neural network layers exhibiting temporal dynamic behavior to the plurality of feature data streams, providing the common feature data stream.

In one embodiment the controller is further configured to perform the common feature extraction based on a neural network exhibiting temporal dynamic behavior.

In one embodiment the neural network exhibiting temporal dynamic behavior is a recurrent neural network (RNN).

In one embodiment one image data stream comprises images at least partially overlapping images in another image data stream.

In one embodiment the object detection arrangement further comprising a plurality of image capturing devices, wherein each image data stream originates from one of the image capturing devices.

In one embodiment at least one of the image capturing device is configured to perform the feature extraction on the corresponding image data stream.

In one embodiment the controller is further configured to combine the plurality of feature data streams into a combined feature data stream.

In one embodiment the object detection arrangement is a smartphone or a tablet computer.

In one embodiment the object detection arrangement is an optical see-through device.

In one embodiment the object detection arrangement is arranged to be used in image retrieval, industrial use, robotic vision and/or video surveillance.

By performing both a local feature extraction on each image data stream and a common feature extraction, using a neural network exhibiting temporal dynamic behavior such as a recurrent neural network or its variants, a feature extraction that takes account of both spatial and temporal aspects are achieved without requiring exhaustive computing resources.

According to one aspect a method for use in an object detection arrangement is provided, the method being for providing an improved feature extraction for object detection, wherein the method comprises: a) receiving a plurality of image data streams; b) performing feature extraction on each of the received plurality of images providing a plurality of feature data streams; and c) performing a common feature extraction based on the plurality of feature data streams providing a common feature data stream for object detection.

According to one aspect there is provided a computer-readable medium carrying computer instructions that when loaded into and executed by a controller of an object detection arrangement enables the viewing device to implement a method according to herein.

According to one aspect there is provided a software component arrangement for detecting objects in an object detection arrangement, wherein the software component arrangement comprises: a) a software component for receiving (212) a plurality of image data streams; b) a software component for performing feature extraction on each of the received plurality of images providing a plurality of feature data streams; and c) a software component for performing a common feature extraction based on the plurality of feature data streams providing a common feature data stream for object detection.

According to one aspect there is provided an arrangement comprising circuitry for detecting objects in an object detection arrangement, wherein the arrangement comprising circuitry comprises: a) a circuitry for receiving a plurality of image data streams; b) a circuitry for performing feature extraction on each of the received plurality of images providing a plurality of feature data streams; and c) a circuitry for performing a common feature extraction based on the plurality of feature data streams providing a common feature data stream for object detection.

Further embodiments and advantages of the present invention will be given in the detailed description. It should be noted that the teachings herein find use in object detection and object detection arrangements in many areas of computer vision, including image retrieval, industrial use, robotic vision, augmented reality and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

FIG. 1A shows a schematic view of an object detection arrangement according to an embodiment of the present invention;

FIG. 1B shows a schematic view of an object detection arrangement according to an embodiment of the present invention;

FIG. 1C shows a schematic view of an object detection arrangement according to an embodiment of the present invention;

FIG. 2A shows a schematic view of an object detection model according to one embodiment of the teachings herein;

FIG. 2B shows a schematic view of an object detection model according to one embodiment of the teachings herein;

DETAILED DESCRIPTION

Figure 3:
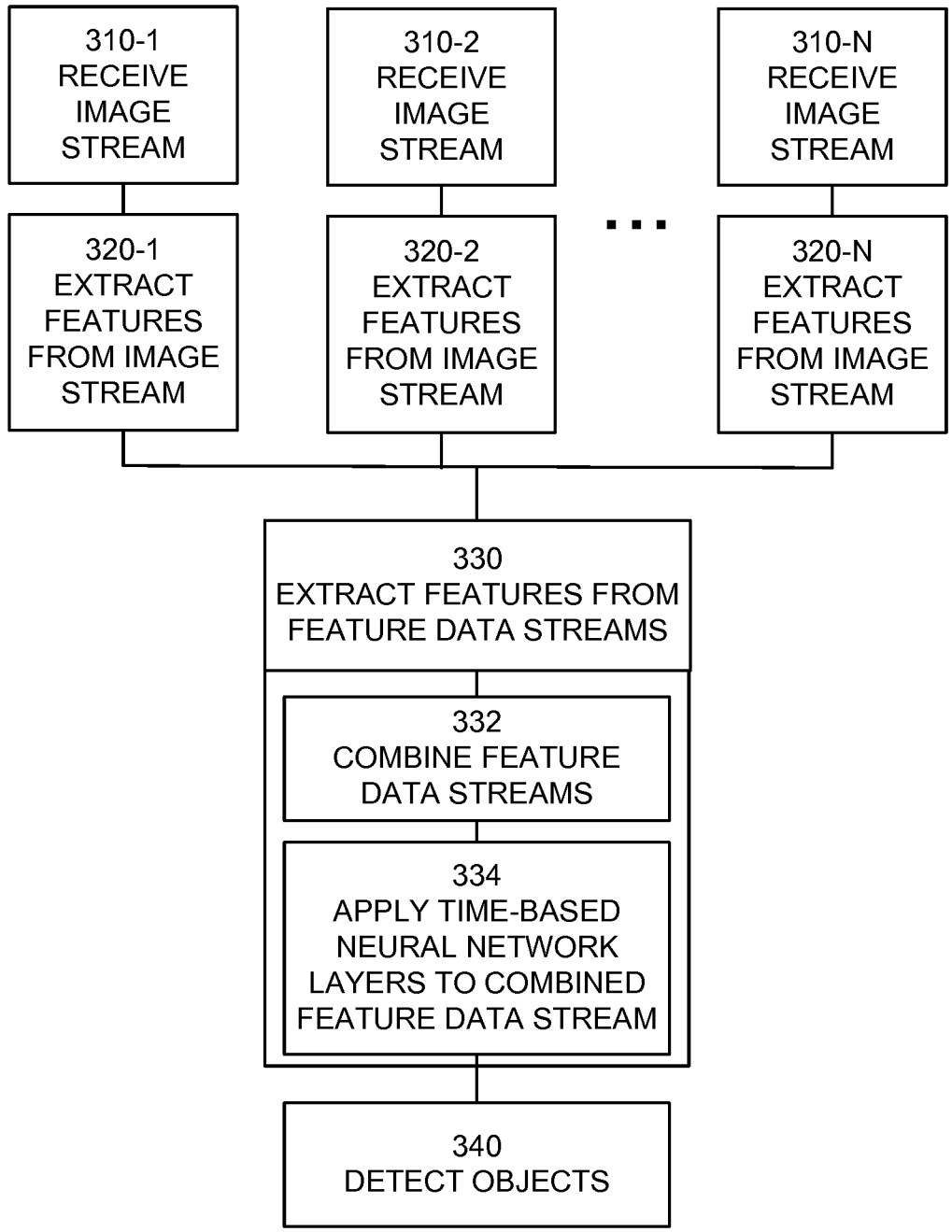
FIG. 3 shows a flowchart of a general method according to an embodiment of the present invention.

FIG. 1A shows a schematic view of an object detection arrangement 100 according to an embodiment of the present invention. The object detection arrangement comprises a controller 101, an image data receiving device, such as for example an array or series (at least two) of image capturing devices 112 (such as cameras or image sensors), an image streaming device 112 (such as a communication interface) or an image data reading device 112 and a memory 102. The controller 101 is configured to receive a series of images, or at least a portion of a series of images from the image data receiving device 112, and to perform object detection on the received (portion of the) series of images. The image data receiving device 112 may be comprised in the object detection arrangement 100 by being housed in a same housing as the object detection arrangement, or by being connected to it, by a wired connection or wirelessly.

It should be noted that the object detection arrangement 100 may comprise a single device or may be distributed across several devices and apparatuses.

The controller 101 is also configured to control the overall operation of the object detection arrangement 100. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits, AISIC, GPU, etc. in addition or as an alternative. For the purpose of this application, all such possibilities and alternatives will be referred to simply as the controller 101.

The memory 102 is configured to store graphics data and computer-readable instructions that when loaded into the controller 101 indicates how the object detection arrangement 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the object detection arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

It should be noted that the teachings herein find use in object detection and object detection arrangements in many areas of computer vision, including object detection in mixed or augmented reality systems, image retrieval, industrial use, robotic vision and video surveillance where a basic object detection arrangement 100 such as in FIG. 1A may be utilized.

FIG. 1B shows a schematic view of an object detection arrangement being a viewing device 100 according to an embodiment of the present invention. In this embodiment, the viewing device 100 is a smartphone or a tablet computer. In such an embodiment, the viewing device further comprises a display arrangement 110, which may be a touch display, and the image data receiving device 112 may be a series of cameras of the smartphone or tablet computer. In such an embodiment the controller 101 is configured to receive an image from the series of cameras 112, detect objects in the image and display the image on the display arrangement 110 along with virtual content indicating or being associated with the detected object(s). In the example embodiment of FIG. 1B, the series of cameras 112 is arranged on a backside (opposite side of the display 110, as is indicated by the dotted contour of the cameras 112) of the object detection arrangement 100 for enabling real life objects behind the object detection arrangement 100 to be captured and shown to a user (not shown in FIG. 1B) on the display 110 along with any displayed virtual content. The displayed virtual content may be information and/or graphics indicating and/or giving information on detected objects.

FIG. 1C shows a schematic view of an object detection arrangement being an optical see-through (OST) viewing device 100 according to an embodiment of the present invention. The viewing device 100 is a see-through device, where a user looks in through one end, and sees the real-life objects in the line of sight at the other end of the viewing device 100.

In one embodiment the viewing device 100 is a head-mounted viewing device 100 to be worn by a user (not shown explicitly in FIG. 1C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device comprises a display arrangement 110 for presenting virtual content to a viewer and an image data receiving device 112 for identifying or detecting objects. As disclosed above with reference to FIG. 1A, the image data receiving device 112 may be remote and comprised in the object detection arrangement through a connection to the object detection arrangement 100.

In the following, simultaneous reference will be made to the object detection arrangements 100 of FIGS. 1A, 1B and 1C.

It should also be noted that even if only one image data receiving device 112 is discussed in the above, the image data receiving device is arranged to receive image data relating to more than one image. The multiple streams of image data may be provided as separate data streams originating from different cameras. The object detection arrangement 100 thus comprises a multiple of cameras as being comprised in the image data receiving device, or rather the image capturing device 112 in embodiments where the image receiving device comprises image capturing devices.

In one embodiment the object detection arrangement 100 may further comprise a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobile) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the object detection arrangement 100 and an external host device (not shown).

The communications interface 103 may be configured to enable the object detection arrangement 100 to communicate with other devices, such as other object detection arrangements 100 and/or smartphones, Internet tablets, computer tablets or other computers, media devices, such as television sets, gaming consoles, video viewer or projectors (not shown), or image capturing devices for receiving the image data streams.

A user interface 104 may be comprised in the object detection arrangement 100 (only shown in FIG. 1B). Additionally or alternatively, (at least a part of) the user interface 104 may be comprised remotely in the object detection arrangement 100 through the communication interface 103, the user interface then (at least a part of it) not being a physical means in the object detection arrangement 100, but implemented by receiving user input through a remote device (not shown) through the communication interface 103. One example of such a remote device is a game controller, a mobile phone handset, a tablet computer or a computer.

FIG. 2A shows a schematic view of an object detection model 200 according to one embodiment of the teachings herein. The object detection model 200 is arranged to be executed by a controller 101 of on object detection arrangement 100 according to herein, a software component arrangement 400 according to herein, an arrangement comprising circuitry 500 according to herein or being utilized by a method according to herein. It should be noted that different parts of the object detection model may be executed by different parts of the corresponding executing arrangement.

The object detection model 200 comprises a plurality of image data stream receivers 212 that receives a plurality of data streams S1, S2 . . . SN corresponding to image streams. The image data stream receivers 212 are operatively connected to an image source; in one embodiment the image receiving devices 112 of the object detection arrangement 100 and in one such embodiment, by being comprised in the corresponding image receiving devices 112.

The image data streams comprise a stream of data representing a stream of images captured by each image capturing device, where each instance of an image has a corresponding instance of an image. In FIG. 2A this is indicated by the train of boxes emanating from each image data receiver 212, where each box may be considered to represent one image, and where each image in a stream has a corresponding image in the other streams, as is indicated by the dashed arrows. This implies that all images are taken at substantially the same time, i.e. as close in time as possible considering timing issues between different image capturing devices. It also indicates that all images are substantially of the same scene, i.e. as overlapping as possible considering distance and angles between the different image capturing devices. Each image stream thus comprises images that at least partially overlaps images in at least another image stream. In beneficial circumstances (such as when the object is placed at a distance from the array of cameras such that there is little or no parallax error), each image stream comprises images at least partially overlapping images in all the other image streams.

By providing streams of images from different image capturing devices (i.e. cameras), a spatial aspect of the images is provided which is highly beneficial for the object detection as more details on an object will be perceivable in the image stream(s).

The object detection model 200 further comprises a plurality of feature extractors (FX) 220, one for each image data stream receiver 212, which feature extractors (FX) 220 are arranged to perform a feature extraction on the data stream received by the image data stream receivers 212. In one embodiment at least one of the feature extractors 220 is based on neural networks and in one such embodiment the at least one of the feature extractors 220 is based on convolutional neural networks (CNN). It should be noted that not all feature extractors 220 may be arranged to perform the same type of feature extraction. As each feature extraction is for each image data stream, and hence for each image capturing device, a local feature extraction is provided.

The output provided by the feature extractors 220 is a plurality of streams of feature data, one stream for each image stream.

The object detection model 200 further comprises a common feature extractor (CFX) 230, arranged to receive each of the plurality of streams of feature data, which common feature extractor (CFX) 230 is arranged to perform a common feature extraction on the feature data streams received from the feature extractors 220.

As a feature data stream is inherently substantially smaller than an image data stream—especially in high resolution and/or in raw (RAW) format—the amount of data provided to the common feature extractor is substantially smaller than the sum of the image data streams received by the image data stream receivers 212. This enables the use of more image streams/capturing devices, as the amount of data otherwise would quickly exceed what would practically feasible to process. The procedure of first performing a local feature extraction on each image stream can thus be considered as making the arrangement of several image capturing devices scalable, at least in a practical sense.

The common feature extractor 230 is arranged to be recurrent in that it implements a temporal dynamic behavior, where at least a part of the result of the analysis performed for one instance of the feature data stream is fed back and provided as input for the analysis to be performed for a future or alter instance of the feature data stream. This is indicated by the feedback arrow indicated as having a delay (indicated by a 'd' in a triangle) associated with it in FIG. 2A. The delay indicates that the output for one frame (i-1) is used as the input for a subsequent frame (i). It should be noted that the delay need not be for a single next frame, but can alternatively or additionally be for one or several frames and for one or several frames in time. That the common feature extractor 230 is recurrent or exhibiting temporal dynamic behavior, provides a temporal aspect to the feature extraction and the common feature extraction is thus based on both temporal aspects (as the common feature extractor 230 exhibits temporal dynamic behavior) and spatial aspects (as the common feature extractor 230 receives feature data from several image sources arranged at different locations). This enables for providing feature data of a high class for enabling a high accurate object detection, while not requiring exhaustive or practically impossible computing resources.

The feature data output provided by the common feature extractor 230 is input to an object detector 240 which based on the feature data provided performs the object detection. In one embodiment, the object detector 240 is configured to perform the object detection utilizing an object detection model based on Machine Learning. In one embodiment, the object detector 240 is configured to perform the object detection utilizing an object detection model based on Deep Learning.

In one embodiment, the image data receiver 212 and the feature extractor 220 are comprised in an image capturing device 112. This enables for the computational load to be distributed and for reducing the bandwidth required to transfer necessary data to the common feature extractor 230.

In one embodiment, the feature extractor 220 and the common feature extractor 230 is comprised in an object detection device. This enables for cheaper image capturing devices as it is not required that they are able to perform feature extraction.

FIG. 2B shows a schematic view of the same object detection model 200 of FIG. 2A, but with increased focus on the common feature extractor 230. The common feature extractor 230 comprises a data stream combiner 232 that combines the feature data streams that it receives into one feature data stream. This enables a single feature extractor 230 to be used and ensures that all aspects of the feature data provided by the various local feature extractors 220 is taken into account in the common feature extraction. The data stream combiner 232 is in one embodiment, arranged to combine the feature data streams received from the feature extractors 220 by concatenating them. The data stream combiner 232 is in one embodiment, arranged to combine the feature data streams received from the feature extractors 220 by interleaving them. The data stream combiner 232 is in one embodiment, arranged to combine the feature data streams received from the feature extractors 220 by adding them. The data stream combiner 232 is in one embodiment, arranged to combine the feature data streams received from the feature extractors 220 by stacking them. The data stream combiner 232 is in one embodiment, arranged to combine the feature data streams received from the feature extractors 220 by adding them. It should be noted that not all image data streams may be of the same size, and that not all feature data streams be of the same size. Any combination of data streams may thus not be a linear combination. For the example of interleaving the streams may be interleaved one-by-one or with a varying number of elements in each interleave.

The common feature extractor 230 is, as stated above, exhibiting temporal dynamic behavior. In one embodiment, the common feature extractor 230 comprises a recurrent neural network (RNN), and in one such embodiment, the common feature extractor comprises a combination of RNN and CNN layers. In one embodiment, the common feature extractor 230 is a convoluted neural network with a recurrent aspect (CNN+RNN).

The common feature extractor 230 is thus in one embodiment a neural network comprising several neural network layers (NNL) 234 where the output of one neural network layer (NNL1) may be used as the input of the next neural network layer (NNL2). In one embodiment, such a neural network layer is an RNN layer. In one embodiment, the first neural network layer NNl1 is an RNN layer.

It should be noted that even if the neural network layers 234 are shown as being linear, they may be arranged in other manners, such as in matrixes or in other lattice structures. It should be noted that all neural network layers need not be of the same type, and one neural network layer may be of a first type, such as RNN, and a second neural network layer may be of a second type, such as CNN. There may thus be one or several CNN layers interspersed between the RNN layers. In FIG. 2, this is shown by the second neural network layer NNL2 not having any delayed input associated with it and being illustrated with dotted lines.

At least one of the neural network layers 234 is also arranged to accept the output of the present layer or a later (subsequent) neural network layer (as indicated by the dashed line) as input. At least one of the neural network layers 234 is also arranged to accept the output of the preceding neural network layer and/or a previous neural network layer (not shown in FIG. 2B) as input, that is, a neural network layer 234 may receive input from another neural network layer, not being the immediately preceding neural network layer.

These different alternatives may be utilized to implement the temporal dynamic behavior of the common feature extractor 230. As indicated by the delays, the feedback is from a series representing an earlier image frame to a series representing a later image frame.

In one embodiment the Neural Network Layers 234 are also arranged, at least one of them, to receive input or store the state of the neural Network Layer 234 for the subsequent analysis. This further implements the temporal dynamic behavior of the common feature extractor 230. FIG. 3 shows a flowchart of a general method according to an embodiment of the teachings herein. The method utilizes an object detection arrangement 100 as taught herein. In one embodiment, the object detection arrangement is configured to perform the object detection utilizing an object detection model based on Machine Learning.

In some embodiments, the object detection arrangement is configured to perform the object detection utilizing an object detection model based on Deep Neural Networks. The description given herein will focus on such embodiments.

A plurality of image data streams corresponding to a plurality of image streams are received 310-1, 310-2, . . . , 310-N by the controller 101 from a plurality of image data receiving devices 112.

An image data stream is part of a series of images, i.e. a video clip and the format could be either raw or compressed.

A feature extraction 320-1, 320-2, . . . , 320-N is performed (by the controller 101) on each received image data stream for local feature extraction providing a plurality of feature data streams.

A common feature extraction is thereafter performed 330 on the plurality of feature data streams providing a common feature data stream on which object detection is performed 340.

The common feature extraction 330 is performed by combining the feature data streams 332 and thereafter extract features by applying 334 a plurality of neural network layers 234 exhibiting temporal dynamic behavior to the combined feature data stream, providing the common feature data stream. As is indicated in FIG. 2A and especially FIG. 2B, the combination of streams need not be made by the same entity as the feature extraction is made by.

Figure 4:
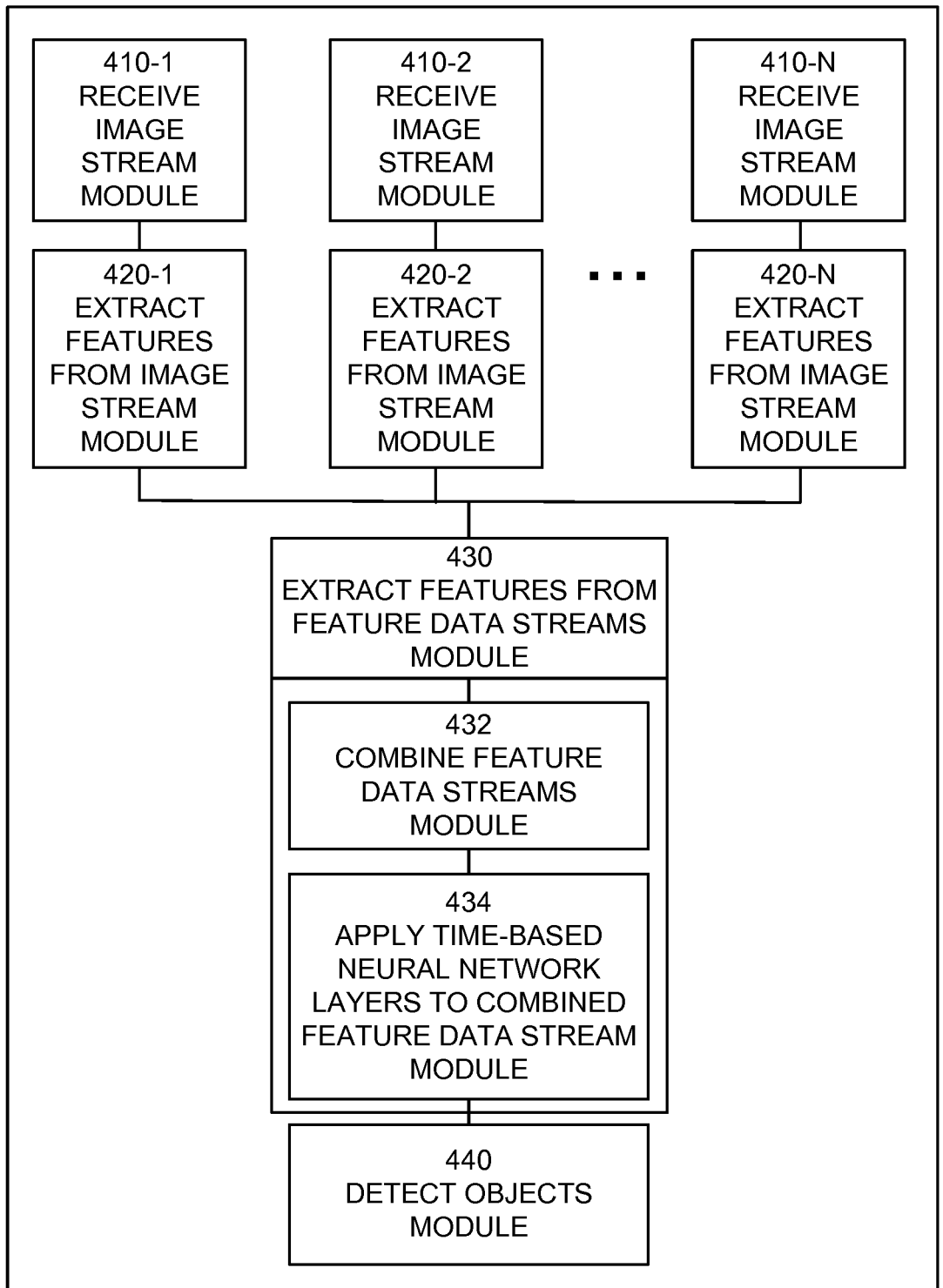
FIG. 4 shows a component view for a software component arrangement according to an embodiment of the teachings herein.

FIG. 4 shows a component view for a software component (or module) arrangement 400 according to an embodiment of the teachings herein. The software component arrangement 400 is adapted to be used in an object detection arrangement 100 as taught herein for providing object detection as taught herein. In one embodiment, the object detection arrangement is configured to perform the object detection utilizing an object detection model based on Machine Learning.

In some embodiments, the object detection arrangement is configured to perform the object detection utilizing an object detection model based on Deep Neural Networks. The description given herein will focus on such embodiments.

The software component arrangement 400 comprises a plurality of software components 410-1, 410-2, . . . , 410-N for receiving a plurality of image data streams corresponding to a plurality of image streams from a plurality of image data receiving devices 112. An image data stream is part of a series of images, i.e. a video clip and the format could be either raw or compressed.

The software component arrangement 400 also comprises at least one software component 420-1, 420-2, . . . , 420-N for performing feature extraction on each received image data stream for local feature extraction providing a plurality of feature data streams.

The software component arrangement 400 also comprises a software component 430 for performing common feature extraction on the plurality of feature data streams providing a common feature data stream. The software component arrangement 400 also comprises a software component 440 for performing object detection on the common feature data stream.

The software component arrangement 400 also comprises a software component 432 for combining the feature data streams 332 and a software component 434 for extracting features by applying a plurality of neural network layers 234 exhibiting temporal dynamic behavior to the combined feature data stream, providing the common feature data stream. As is indicated in FIG. 2A and especially FIG. 2B, the combination of streams need not be made by the same entity or same software component as the feature extraction is made by and software component 432 need not be comprised in the software component 430.

Figure 5:
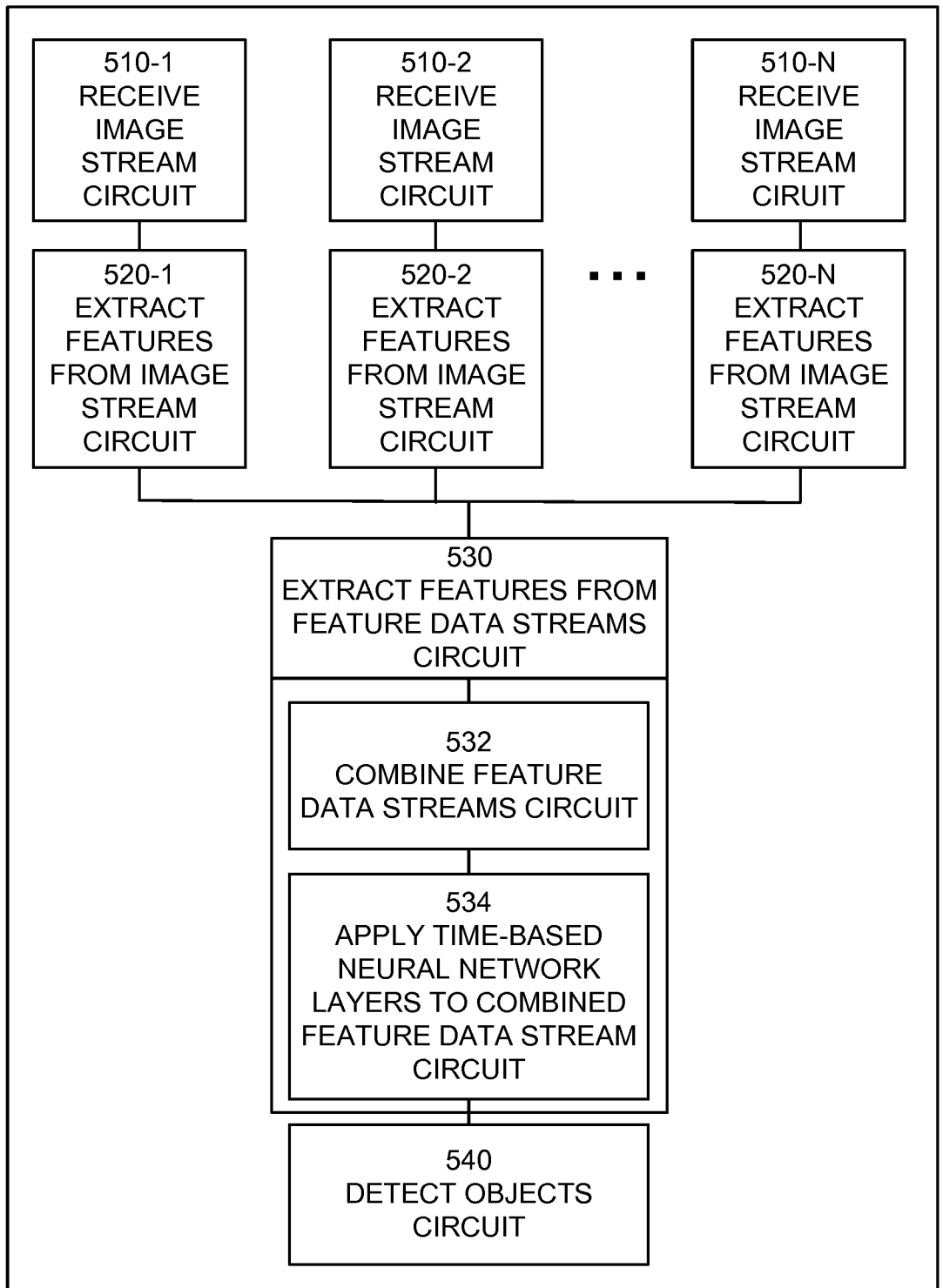
FIG. 5 shows a component view for an arrangement comprising circuits according to an embodiment of the teachings herein.

FIG. 5 shows a component view for an arrangement comprising circuitry for object detection 500 according to an embodiment of the teachings herein. The arrangement comprising circuitry for object detection 500 is adapted to be used in an object detection arrangement 100 as taught herein for providing object detection.

In one embodiment, the object detection arrangement is configured to perform the object detection utilizing an object detection model based on Machine Learning.

In some embodiments, the object detection arrangement is configured to perform the object detection utilizing an object detection model based on Deep Neural Networks. The description given herein will focus on such embodiments.

The arrangement comprising circuitry for object detection 500 of FIG. 5 comprises a plurality of circuitries 510-1, 510-2, . . . , 510-N for receiving a plurality of image data streams corresponding to a plurality of image streams from a plurality of image data receiving devices 112. An image data stream is part of a series of images, i.e. a video clip and the format could be either raw or compressed.

The arrangement comprising circuitry for object detection 500 also comprises at least one circuitry 520-1, 520-2, . . . , 520-N for performing feature extraction on each received image data stream for local feature extraction providing a plurality of feature data streams.

The arrangement comprising circuitry for object detection 500 also comprises a circuitry 530 for performing common feature extraction on the plurality of feature data streams providing a common feature data stream. The arrangement comprising circuitry for object detection 500 also comprises a circuitry 550 for performing object detection on the common feature data stream.

The arrangement comprising circuitry for object detection 500 also comprises a circuitry 532 for combining the feature data streams 332 and a circuitry 534 for extracting features by applying a plurality of neural network layers 234 exhibiting temporal dynamic behavior to the combined feature data stream, providing the common feature data stream. As is indicated in FIG. 2A and especially FIG. 2B, the combination of streams need not be made by the same entity or same circuitry as the feature extraction is made by and circuitry 532 need not be comprised in the circuitry 530.

Figure 6:
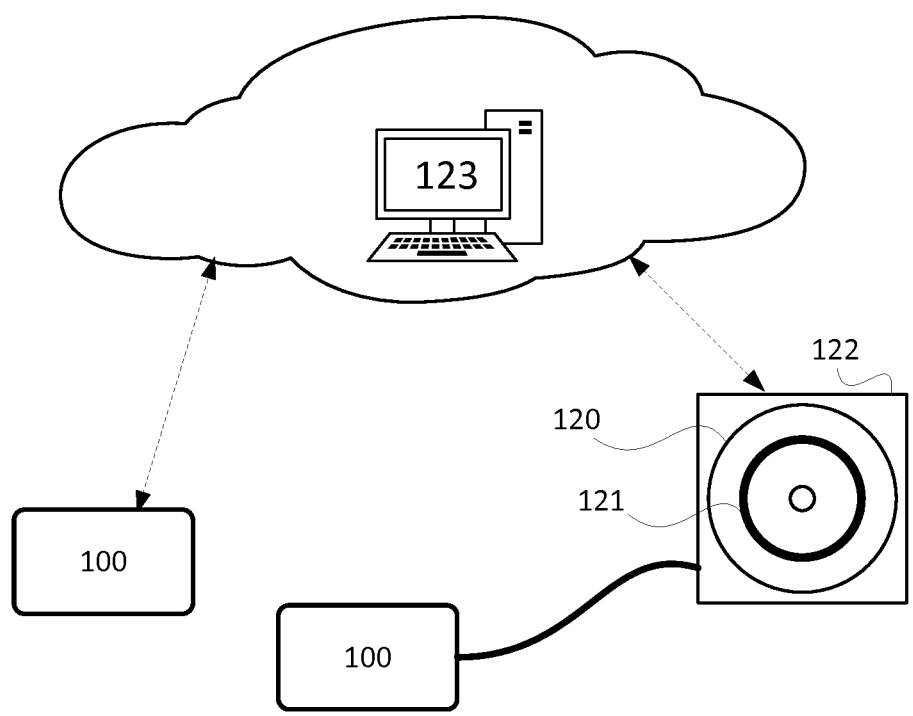
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of an object detection arrangement 100 enables the object detection arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the object detection arrangement 100 for being executed by the controller 101.

The computer disc reader 122 may also or alternatively be connected to (or possibly inserted into) an object detection arrangement 100 for transferring the computer-readable computer instructions 121 to a controller of the object detection arrangement (presumably via a memory of the object detection arrangement 100).

FIG. 6 shows both the situation when an object detection arrangement 100 receives the computer-readable computer instructions 121 via a server connection and the situation when another object detection arrangement 100 receives the computer-readable computer instructions 121 through a wired interface. This enables for computer-readable computer instructions 121 being downloaded into an object detection arrangement 100 thereby enabling the object detection arrangement 100 to operate according to and implement the invention as disclosed herein.

The invention claimed is:

1. An object detection arrangement comprising:
a plurality of image capturing devices; and
a controller configured to:
receive a plurality of image data streams, each of the plurality of image data streams originating from one of the plurality of image capturing devices;
perform local feature extraction on each of the received plurality of images to provide a plurality of feature data streams;
perform a common feature extraction at least by applying a plurality of neural network layers exhibiting temporal dynamic behavior to the plurality of feature data streams, the plurality of neural network layers being arranged such that one of the plurality of neural network layers receives input from another of the plurality of neural network layers not immediately preceding the one of the plurality of neural network layers, the common feature extraction being based on the plurality of feature data streams to provide a common feature data stream for object detection; and
at least one of the plurality of image capturing devices is configured to perform the local feature extraction on a corresponding image data stream.

2. The object detection arrangement according to claim 1, wherein the controller is further configured to perform object detection based on the common feature data stream.

3. The object detection arrangement according to claim 2, wherein the object detection is based on a Deep Neural Network model.

4. The object detection arrangement according to claim 1, wherein at least one of the plurality of neural network layers exhibiting temporal dynamic behavior is a recurrent neural network (RNN).

5. The object detection arrangement according to claim 1, wherein one image data stream comprises images at least partially overlapping images in another image data stream.

6. The object detection arrangement according to claim 1, wherein the controller is further configured to combine the plurality of feature data streams into a combined feature data stream.

7. The object detection arrangement according to claim 1, wherein the object detection arrangement is a one of smartphone and a tablet computer.

8. The object detection arrangement according to claim 1, wherein the object detection arrangement is an optical see-through device.

9. The object detection arrangement according to claim 1, wherein the object detection arrangement is arranged to be used in image retrieval, industrial use, robotic vision and/or video surveillance.

10. The object detection arrangement according to claim 2, wherein at least one of the plurality of neural network layers exhibiting temporal dynamic behavior is a recurrent neural network (RNN).

11. The object detection arrangement according to claim 2, wherein one image data stream comprises images at least partially overlapping images in another image data stream.

12. The object detection arrangement according to claim 2, further comprising a plurality of image capturing devices, wherein each image data stream originates from one of the image capturing devices.

13. A method for object detection in an object detection arrangement, the method comprising:
receiving a plurality of image data streams, each of the plurality of image data streams originating from one of a plurality of image capturing devices;
performing local feature extraction on each of the received plurality of images to provide a plurality of feature data streams;
performing a common feature extraction at least by applying a plurality of neural network layers exhibiting temporal dynamic behavior to the plurality of feature data streams, the plurality of neural network layers being arranged such that one of the plurality of neural network layers receives input from another of the plurality of neural network layers not immediately preceding the one of the plurality of neural network layers, the common feature extraction being based on the plurality of feature data streams providing to provide a common feature data stream for object detection; and
configuring at least one of the plurality of image capturing devices to perform the local feature extraction on a corresponding image data stream.

14. A non-transitory computer-readable storage medium storing computer instructions that when loaded into and executed by a controller of an object detection arrangement causes the object detection arrangement to perform a method, the method comprising:
receiving a plurality of image data streams, each of the plurality of image data streams originating from one of a plurality of image capturing devices;
performing local feature extraction on each of the received plurality of images to provide a plurality of feature data streams;
performing a common feature extraction at least by applying a plurality of neural network layers exhibiting temporal dynamic behavior to the plurality of feature data streams, the plurality of neural network layers being arranged such that one of the plurality of neural network layers receives input from another of the plurality of neural network layers not immediately preceding the one of the plurality of neural network layers, the common feature extraction being based on the plurality of feature data streams to provide a common feature data stream for object detection; and
configuring at least one of the plurality of image capturing devices to perform the local feature extraction on a corresponding image data stream.

* * * * *